Nov. 30, 1926.

J. C. PETTIT

SEPARATOR

Filed Jan. 15, 1926   3 Sheets-Sheet 1

1,609,188

James C. Pettit
INVENTOR

BY Victor J. Evans
ATTORNEY

WITNESS

Nov. 30, 1926.
J. C. PETTIT
SEPARATOR
Filed Jan. 15, 1926  3 Sheets-Sheet 2
1,609,188
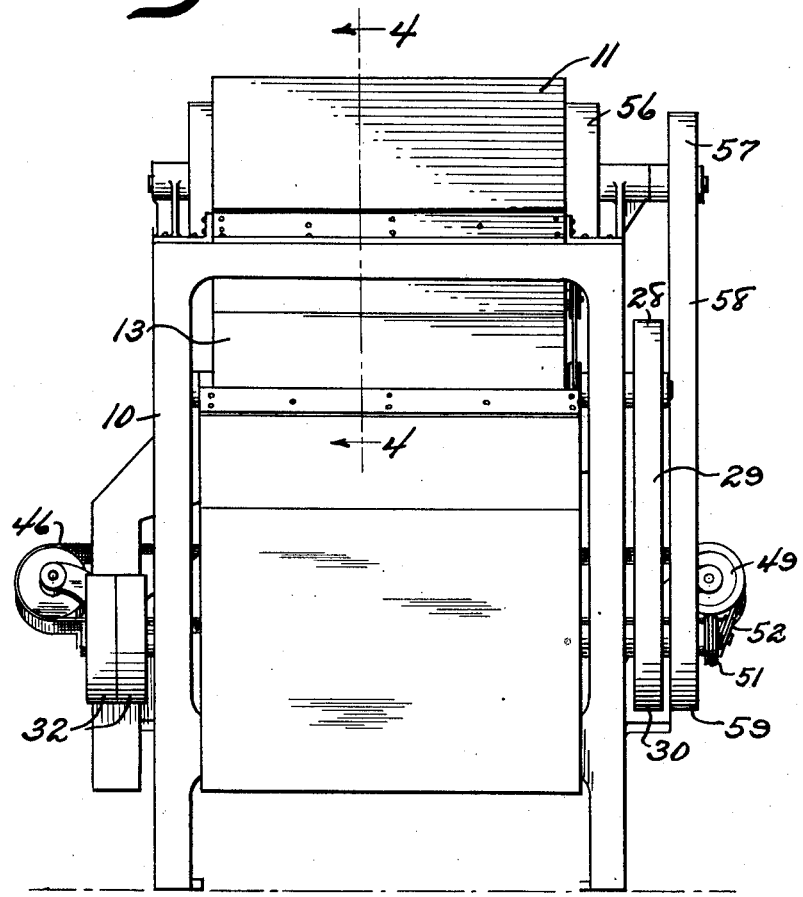
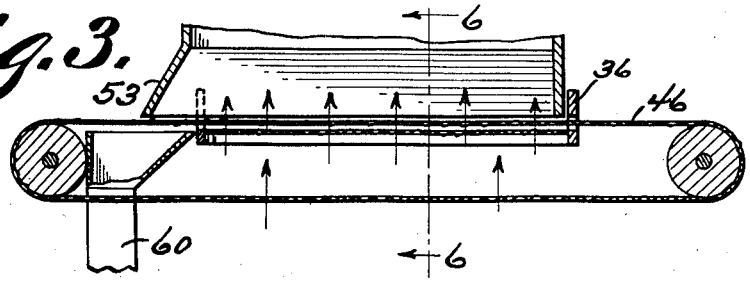
James C. Pettit
INVENTOR
BY Victor J. Evans
ATTORNEY
WITNESS:

Nov. 30, 1926.
J. C. PETTIT
SEPARATOR
Filed Jan. 15, 1926   3 Sheets-Sheet 3
1,609,188
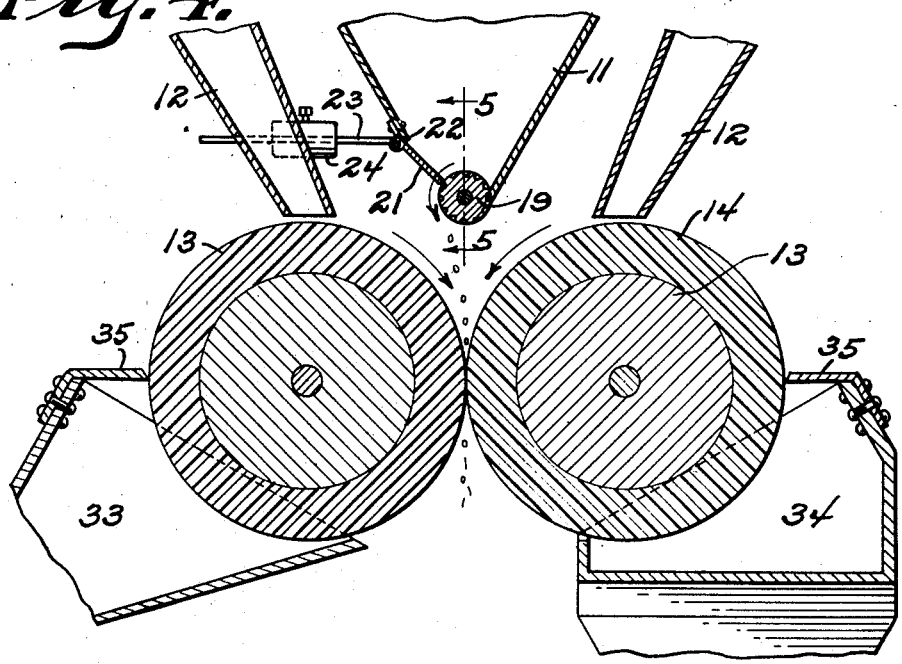
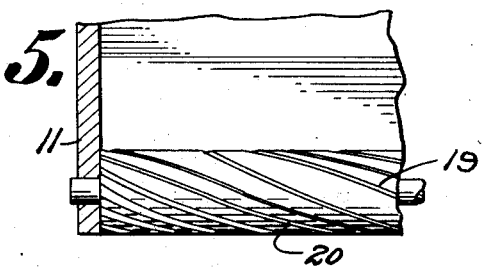
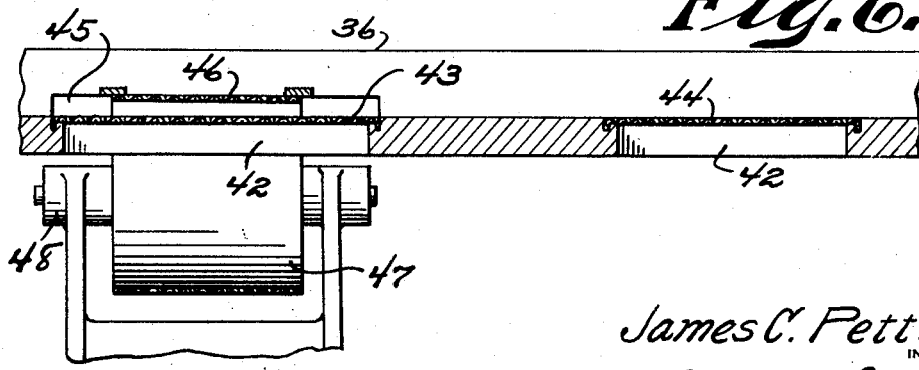
James C. Pettit
INVENTOR
BY Victor J. Evans
ATTORNEY
WITNESS Patented Nov. 30, 1926.

1,609,188

UNITED STATES PATENT OFFICE.

JAMES C. PETTIT, OF BLACKSTONE, VIRGINIA, ASSIGNOR OF ONE-THIRD TO CLAUDE MULLENAX AND ONE-THIRD TO BENHAM MORRISS, BOTH OF BLACKSTONE, VIRGINIA.

SEPARATOR.

Application filed January 15, 1926. Serial No. 81,500.

This invention relates to grain separators and has for an object the provision of a machine by means of which smut grain and garlic or wild onion may be separated from good wheat grain and the juices of the garlic absorbed, before the protecting coat of the grain is broken, so that danger of contamination of the inner food substance when the grain is ground, will be avoided.

Another object of the invention is the provision of a grain separator having novel means for separating the garlic hulls and the smut dust and other extraneous matter from the wheat grains after the garlic has been crushed and its juices absorbed.

A further object of the invention is the provision of a machine which in addition to the above mentioned and other advantages, combines simplicity of construction, efficiency, and will separate a maximum amount of grain in a relatively short time at a minimum cost.

With the above and other objects in view, the invention further includes the following novel features and details of construction, to be hereinafter more fully described, illustrated in the accompanying drawings and pointed out in the appended claims.

In the drawings:—

Figure 2 is an end view of the same.

Figure 3 is a sectional view taken substantially on the line 3—3 of Figure 1.

Figure 4 is an enlarged fragmentary section on the line 4—4 of Figure 2.

Figure 5 is a similar view on the line 5—5 of Figure 4.

Figure 6 is a like view on the line 6—6 of Figure 3.

Figure 1:
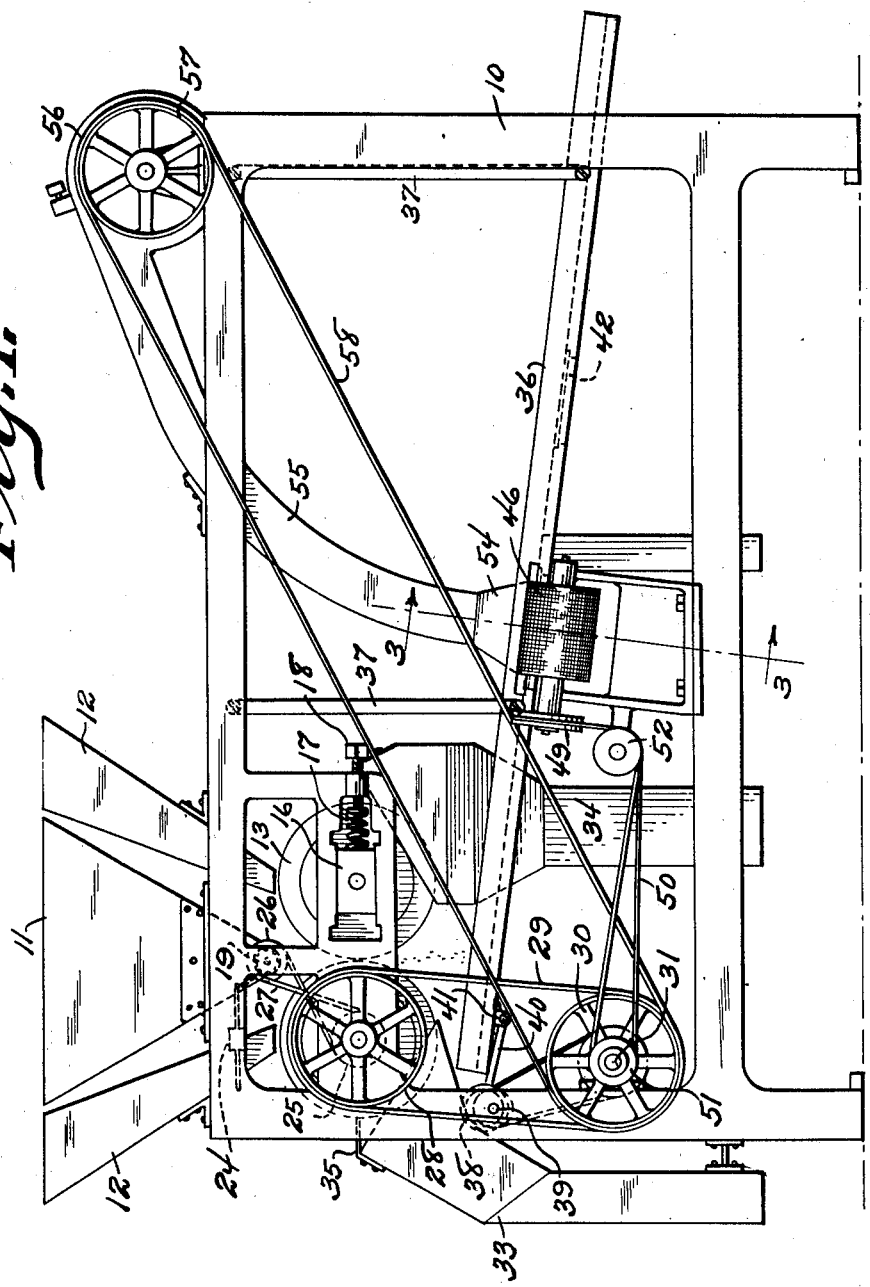
Figure 1 is a side elevation of a separator constructed in accordance with the invention.

Referring to the drawings in detail wherein like characters of reference denote corresponding parts, the reference character 10 indicates the frame of the machine which may be of any suitable construction or design and which supports in any suitable manner, a main hopper 11 which is designed to hold the material to be separated. At opposite sides of the hopper 11 are auxiliary hoppers 12 and these last mentioned hoppers are designed to hold a low grade of flour or similar material.

The lower ends of the hoppers 12 are substantially closed by pressure rolls 13 which are provided with a facing 14 of rubber or other compressible material. This facing is of a character to permit of the passage of wheat grains therebetween without injury to said grains, but which will crush "smut" grains and garlic or wild onion passing between them. The rolls 13 are in frictional contact and this contact is regulated by providing one of the rolls with sliding bearings 16, the latter being yieldingly held against movement in one direction by springs 17 and the tension of these springs is regulated by adjusting screws 18.

The material from the hopper 11 is fed to the rolls 13 by a feed roll 19 which is spirally grooved as shown at 20 and the periphery of this roll is in contacting engagement with a regulating plate 21. The plate 21 is pivotally mounted as shown at 22 and has extending therefrom an arm 23 upon which is adjustably mounted a weight 24, so that pressure of the plate 21 upon the roll 19 may be accurately regulated.

The shaft of one of the rolls 13 has secured thereon a grooved pulley 25, while the shaft of the roll 19 carries a grooved pulley 26 and these pulleys are connected by a belt 27. Also secured upon the shaft of one of the rolls 13 is a pulley 28 which is connected by means of a belt 29 with a pulley 30, the latter being fast upon a shaft 31 mounted in suitable bearings supported by the frame 10. This shaft has mounted upon its opposite end fast and loose pulleys 32, the fast pulley receiving power from any suitable source.

As thus far described, the rolls 13 and the roll 19 will be operated from the shaft 31 and as the rolls 13 pass beneath the lower ends of the hoppers 12, these rolls are dusted with flour from the hoppers. The wheat grains and garlic are fed from the hopper 11 by the roll 19, the plate 21 being adjusted to feed sufficient material to practically form one layer upon the roll. The perfect grain will pass uninjured between the rolls 13, while the smut grain will be crushed by said rolls and the garlic will be likewise crushed. The juice of the garlic will thus be removed and will be absorbed by the dust previously distributed over the rolls 13 from the hoppers 12 and this dust will absorb the garlic juices while the garlic hulls relieved of their juices will pass downward between the rolls.

The rolls 13 revolve within the upper ends of hoppers or chutes 33 and 34 and these hoppers or chutes carry scrapers 35 which engage the surfaces of the pressure rolls and scrape therefrom the paste formed by the powder and the absorbed garlic juices. If desired, these scraper blades may be adjustably mounted. The chute 34 extends downward outside of the side members of the frame 10, while the chute 33 extends outward at one end of the frame and the material passing through these chutes may be directed into suitable receptacles (not shown).

The grain and garlic hulls passing between the rolls 13 fall downward upon an inclined transversely channel-shaped chute 36 which is mounted for swinging movement in the frame, hanger rods 37 being provided for this purpose. The chute 36 is adapted to be swung longitudinally so as to provide a shaker or agitator and for this purpose there is provided an eccentric 38 which is mounted upon a shaft 39 and which has its arm 40 pivotally secured to the upper end of the chute 36 as shown at 41. The material falling upon the chute 36 will thus gravitate down the chute, the motion of the chute aiding in this movement.

The chute 36 is provided with spaced openings 42 and secured above one of these openings and extending transversely of the chute is a screen 43, while a similar screen 44 is positioned over the other opening. The side walls of the chute 36 at each end of the screen 43 are provided with openings 45 for the passage of an endless screen 46, the latter being spaced a sufficient distance above the screen 43 to permit of the passage therebetween of a single layer of grain and to also permit the crushed garlic to pass beneath the screen 46. This last mentioned screen is mounted upon rollers 47 which are supported in suitable bearings 48 at each side of the chute 36 and the shaft of one of these rollers has secured thereon a grooved pulley 49 which is driven by a belt 50 and a pulley 51 mounted upon the shaft 31. The belt 50 passes over an idler pulley 52.

Located above the endless screen 46 and extending transversely across the chute 36 and through one of the side walls of the chute as shown at 53 is the lower end 54 of a conduit 55. The upper end of this conduit is in communication with the casing 56 of a suction fan upon whose shaft is mounted a pulley 57 and this pulley is driven by a belt 58 which passes around a pulley 59 fast upon the shaft 31.

When the grain and garlic reach a position upon the screen 43 beneath the endless screen 46, the suction fan will raise the garlic hulls upward against the under face of the screen 46. This is due to the fact that the removal of the garlic juices has lightened and flattened the hulls so that they are considerably lighter than the grain. The garlic hulls will thus be carried transversely of the chute or to the left of Figure 3 of the drawings and when they reach a position within the extended portion 53 of the mouth of the conduit 55 they will be beyond the edge of the chute 36 and out of the path of suction of the fan. The garlic hulls will then drop into the mouth of a chute 60. The grain will continue to gravitate downward toward the outer end of the chute 36 and when passing over the screen 44, hulls or other relatively small matter which has not been picked up by the suction fan will fall through the screen 44, while the grain will pass outward at the end of the chute.

The invention is susceptible of various changes in its form, proportions and minor details of construction and the right is herein reserved to make such changes as properly fall within the scope of the appended claims.

Having described the invention what is claimed is:—

1. In a separator, an agitator, a screen conveyor extending across and spaced from the bottom of the agitator, suction means positioned above the conveyor screen to hold relatively light material in contact with said conveyor screen and convey said material beyond the agitator, means outside of the agitator to relieve the suction and means to operate the conveyor screen.

2. In a separator, an agitator, a screen-like bottom for the agitator, an endless screen conveyor having one of its flights spaced above the agitator, a suction conduit, means to provide suction in said conduit and an elongated mouth for the conduit extending above the screen conveyor and having one of its ends extending beyond the side edge of the agitator.

3. In a separator, an agitator, a screen-like bottom for the agitator, flanges extending along opposite edges of the agitator and having oppositely located openings therein, an endless conveyor having one of its flights spaced above the agitator and extending through the opening and suction means extending longitudinally of the conveyor above the same.

In testimony whereof I affix my signature.

JAMES C. PETTIT.